United States Patent
Duppe

(10) Patent No.: US 9,267,960 B2
(45) Date of Patent: Feb. 23, 2016

(54) MEASUREMENT ARRANGEMENT FOR A MOUNTED SHAFT

(75) Inventor: Carsten Duppe, Kuernach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 12/677,151

(22) PCT Filed: Sep. 3, 2008

(86) PCT No.: PCT/DE2008/001481
§ 371 (c)(1),
(2), (4) Date: Mar. 11, 2010

(87) PCT Pub. No.: WO2009/033458
PCT Pub. Date: Mar. 19, 2009

(65) Prior Publication Data
US 2010/0189384 A1    Jul. 29, 2010

(30) Foreign Application Priority Data
Sep. 12, 2007    (DE) .......................... 10 2007 043 392

(51) Int. Cl.
| | | |
|---|---|---|
| F16C 32/00 | (2006.01) | |
| F16J 15/32 | (2006.01) | |
| G01L 1/12 | (2006.01) | |
| G01B 7/30 | (2006.01) | |
| G01P 3/44 | (2006.01) | |
| G01L 5/00 | (2006.01) | |
| G01P 3/487 | (2006.01) | |
| F16C 41/00 | (2006.01) | |
| F16C 19/52 | (2006.01) | |
| F16C 33/58 | (2006.01) | |
| F16C 19/06 | (2006.01) | |

(52) U.S. Cl.
CPC ............... *G01P 3/443* (2013.01); *F16C 19/522* (2013.01); *F16C 33/586* (2013.01); *F16C 41/007* (2013.01); *G01L 5/0023* (2013.01); *G01P 3/487* (2013.01); *F16C 19/06* (2013.01)

(58) Field of Classification Search
CPC ....... G01L 5/0023; G01P 3/443; G01P 3/487; F16C 33/586; F16C 19/06; F16C 19/522; F16C 41/007
USPC .................... 384/448; 341/14, 15; 73/862.69, 73/862.193, 862.322; 324/173, 174, 324/207.25; 277/551
See application file for complete search history.

(56) References Cited

U.S. PATENT DOCUMENTS

| | | | | |
|---|---|---|---|---|
| 4,175,430 A | * | 11/1979 | Morrison et al. | .......... 73/862.55 |
| 4,688,951 A | * | 8/1987 | Guers | ............................ 384/446 |
| 4,970,462 A | * | 11/1990 | Richmond | ..................... 324/174 |
| 5,195,831 A | * | 3/1993 | Faye et al. | ...................... 384/448 |

(Continued)

FOREIGN PATENT DOCUMENTS

| | | |
|---|---|---|
| WO | 2006013092 A1 | 2/2006 |
| WO | 2007049602 A1 | 3/2007 |

*Primary Examiner* — Adam D Rogers
(74) *Attorney, Agent, or Firm* — Simpson & Simpson, PLLC

(57) ABSTRACT

A measurement arrangement for a shaft mounted in a bearing. The measurement arrangement has a magnetic coding and a receiver. The receiver detects a change of the magnetic field of the magnetic coding when the mounted shaft is subjected to mechanical stress. The measurement arrangement is used in conjunction with a shaft mounted in a rolling or sliding bearing. The magnetic coding is disposed at a front end of a bearing component. Also, a rolling bearing and a bearing ring and a seal are disclosed.

16 Claims, 3 Drawing Sheets

(56) References Cited

U.S. PATENT DOCUMENTS

| | | | |
|---|---|---|---|
| 5,261,752 A * | 11/1993 | Ouchi et al. | 384/448 |
| 5,297,439 A * | 3/1994 | Tyren et al. | 73/779 |
| 5,309,094 A * | 5/1994 | Rigaux et al. | 324/174 |
| 5,575,568 A * | 11/1996 | Rigaux et al. | 384/448 |
| 5,649,772 A * | 7/1997 | Schlereth et al. | 384/484 |
| 5,674,011 A * | 10/1997 | Hofmann et al. | 384/448 |
| 5,969,518 A * | 10/1999 | Merklein et al. | 324/173 |
| 6,703,734 B2 * | 3/2004 | Hakamata et al. | 310/90 |
| 6,817,253 B2 * | 11/2004 | Gandrud | 73/862.23 |
| 6,841,993 B2 * | 1/2005 | Iwamoto et al. | 324/207.25 |
| 6,863,442 B2 * | 3/2005 | Iwamoto et al. | 384/448 |
| 6,931,940 B2 * | 8/2005 | Baudendistel | 73/779 |
| 6,984,072 B2 * | 1/2006 | Landrieve | 384/448 |
| 7,033,080 B2 * | 4/2006 | Landrieve et al. | 384/448 |
| 7,245,123 B2 * | 7/2007 | Inoue et al. | 324/209 |
| 7,290,938 B2 * | 11/2007 | Aoki et al. | 384/448 |
| 7,927,018 B2 * | 4/2011 | Heim et al. | 384/448 |
| 8,330,455 B2 * | 12/2012 | Duppe et al. | 324/207.25 |
| 2006/0214823 A1 * | 9/2006 | Shiotsuka et al. | 341/50 |
| 2006/0245677 A1 * | 11/2006 | Kenworthy et al. | 384/448 |
| 2007/0014498 A1 * | 1/2007 | Aoki et al. | 384/448 |
| 2007/0089537 A1 * | 4/2007 | Tawara | 73/862.322 |
| 2007/0110350 A1 * | 5/2007 | Ohtsuki et al. | 384/448 |
| 2008/0297143 A1 * | 12/2008 | Tanaka et al. | 324/173 |

* cited by examiner

MEASUREMENT ARRANGEMENT FOR A MOUNTED SHAFT

This application is a 371 of PCT/DE2008/001481 filed Sep. 3, 2008, which in turn claims the priority of DE 10 2007 043 392.3 filed Sep. 12, 2007, the priority of both applications is hereby claimed and both applications are incorporated by reference herein.

FIELD OF THE INVENTION

The invention relates to a measurement arrangement for a shaft which is mounted in a bearing, a roller bearing, as well as a bearing ring, in particular an inner ring or outer ring of a roller bearing, and a seal, in particular a seal for a roller bearing.

WO 2006/013092 A1 describes a measurement arrangement for detection of the rotational speed, the rotational direction and the angle as well as the torque of a mounted shaft, by using the magnetostrictive effect. The magnetostrictive effect relates to the observation that the occurrence of magnetization in a solid body causes a length change or, in the converse effect, that a length change or more generally a mechanical load on a magnetized solid body produces a change in the magnetization of the solid body. The last-mentioned phenomenon can be used to detect mechanical stresses which occur in the body of the shaft during rotation of the shaft, in such a way that it is possible to deduce characteristic variables such as the rotational speed, the rotational direction and the torque on the shaft. The measurement arrangement in the cited document provides for a section of the shaft to be provided with permanent magnetization as a magnetic coding such that mechanical stresses which occur in the shaft change the magnetic field resulting from the coding, outside the body of the shaft. That section of the shaft which is provided with the magnetic coding is therefore in the form of a signal transmitter of the measurement arrangement. At least one signal receiver is arranged outside the body of the shaft, but in the immediate vicinity of the shaft, for example a magnetic coil which detects the magnetic field of the coding, and in particular also a change in the magnetic field of the coding when a mechanical load is applied to the shaft, outside the body of the shaft. One development of the measurement arrangement in the cited document provides for the coding to be in two layers, wherein a first area, close to the surface, in the magnetized section of the shaft has a first magnetization, and a second area, further away from the surface, has a second magnetization, as a result of which the direction and magnitude of the first magnetization and the second magnetization are set in such a way that when no stress is being applied to the shaft, outside of the body of the shaft, the magnetic field at the location of the signal receiver just disappears while, when mechanical stresses occur in the body of the shaft, a magnetic field occurs outside the body of the shaft. This has the disadvantage that said measurement arrangement requires a shaft which is magnetizable at least in places. The method is not directly applicable to shafts which are mounted in a roller bearing since the signal receiver must be arranged in the immediate vicinity of the magnetized section of the shaft, although the magnetized section is held in one of the bearing rings. In this case it is also disadvantageous to arrange the signal receiver between the bearing rings in the shaft. It is likewise impossible to arrange the magnetized section of the shaft at one end of the shaft, since the magnetic field of the body of the shaft is dominated by stray fields at the end of the body, which stray fields do not allow any reliable conclusion to be drawn about the magnetization of the body of the shaft.

Even if the magnetized section is arranged outside of the bearing ring of the bearing mounting the shaft, but is arranged immediately adjacent to the section of the shaft mounted in the bearing ring, it is also disadvantageous, because the magnetic field of the body of the shaft is superimposed by the bearing ring, which itself causes mechanical stresses in the body of the shaft and likewise consists of a magnetic material or at least a magnetizable material.

U.S. Pat. No. 4,688,951 B describes a roller bearing having an inner ring and an outer ring, wherein a measurement arrangement is provided which detects the relative rotary movement of the two bearing rings. For this purpose, a magnetic sensor and a magnet are fitted via a first deflector plate to the outer ring, and two magnet coils are fitted to the inner ring. When one of the magnet coils passes the magnet, a voltage is induced in the magnet coil, and acts on the other magnet coil such that the magnetic field of the other magnet coil is detected by the magnetic sensor. The magnetic sensor, the magnet and the two magnetic coils are fitted to the respective bearing ring via the two deflector plates, which have an L-shaped cross section, and this has the disadvantage that a large amount of space is occupied in the interior of the bearing. Because of the deflector plates which are fitted on both sides of the roller bodies, the bearing has a longitudinal extent which is considerably greater than the size of the roller bodies in the direction of the bearing axis. A further disadvantage is that gaps are formed, through which dirt can enter the bearing. Another disadvantage is that the magnet has a very strong magnetic field, which means that dirt can be drawn into the essentially unprotected bearing. Another disadvantage is that a cable connection must be provided, in order to connect the two magnetic coils. The measurement arrangement does not provide any capability to detect any axial movement of the shaft that is being held.

OBJECT OF THE INVENTION

The object of the invention is to make the initially mentioned measurement arrangement available for a shaft which is mounted in a roller bearing or journal bearing.

SUMMARY OF THE INVENTION

This object is achieved by said measurement arrangement according to the invention having a magnetic coding arranged directly and only on an end side of a bearing, the magnetic coding further arranged to exhibit a magnetic field that changes by a magnetostrictive effect in response to a mechanical load applied to a shaft and by a roller bearing with a bearing ring or a seal having the above magnetic coding.

As a result of the magnetic coding being arranged on a component of the roller bearing but not on the body of the shaft itself, it is possible to also make use of the magnetostrictive effect for shafts whose body is not produced from a magnetic material or a material which is magnetizable. It is also possible, even if the body of the shaft is composed of a material which is magnetizable, to keep the shaft free of magnetic fields over its entire extent, as may be required for certain applications, for example in medical technology, for example for NMR measurements.

Because the shaft is clamped in firmly, mechanical stresses in the body of the shaft are transmitted to the roller bearing which supports it and can alternatively be determined on that component of the roller bearing which is connected to the shaft, instead of on the body of the shaft itself. In particular, there is sufficient space for the component of the roller bearing to arrange the receiver for the measurement arrangement, for example the at least one magnet.

It has also been found to be advantageous that the receiver that is part of the measurement arrangement can be arranged on an extension of the axis of the shaft, that is to say it need no longer be arranged parallel to the section provided with the coding, and thus parallel to the body of the shaft. The arrangement of the receiver on the extension of the axis of the shaft results in a degree of freedom of the design which, for example, allows effective space utilization. In this case, the receiver can be arranged on one of the components of the roller bearing or on the component which holds the roller bearing.

Because the magnetic coding is arranged on an end surface of the component of the bearing, the magnetic coding does not engage the space between the two mounted parts. In this case, an "end surface" means any surface of a bearing part which forms a plane which is essentially at right angles to the bearing axis. In the case of a bearing seal, those sides of the seal which point inward and outward are in each case referred to as an end surface of the seal.

It is preferable for the roller bearing to comprise an outer ring and/or an inner ring as component, and for the magnetic coding to be arranged on an end surface of the outer ring and/or of the inner ring. Said end surfaces are easily accessible from outside the bearing, in such a way that the receiver which reads the signals of the magnetic coding can easily be installed there. In contrast to the cylindrical inner surfaces of the inner ring or outer ring, said end surfaces are flat, which means that the magnetic coding can easily be applied, particularly when it is formed by a permanent magnet or a resonant circuit.

It is preferable for the magnetic coding to comprise a sequence of areas which are radially circumferential in the end surface of the outer ring or inner ring, wherein each two adjacent areas have different magnetization. The areas, which are in the form of circle sectors, represent a magnetic coding which can be produced easily, with the number of areas being adjustable such that the spatial resolution of the magnetic coding can be increased.

Alternatively or in addition to an arrangement of the magnetic coding on one of the bearing rings, the inner ring or outer ring, of the roller bearing, it is preferable for the roller bearing to comprise a seal as a component, and for the magnetic coding to be arranged on one side of the seal. Particularly if the magnetic coding is arranged on that side of the seal which faces outward, the magnetic coding is easily accessible from the outside. Furthermore, it has been found to be advantageous for roller bearings which have already been installed to retrospectively be provided with magnetic coding, by replacement of the seal.

If the magnetic coding is arranged on a surface of the seal as seen in FIG. 2A, it is preferable for the magnetic codings 21a and 21b to comprise a sequence of sections which are radially circumferential in the surface of that side of the seal which faces outward, wherein each two adjacent sections have different magnetization as seen schematically by the alternating symbols within codings 21a and 21b. This results in the magnetic coding having high spatial resolution.

As an alternative to the magnetic coding being formed by at least one section in which a mechanical load on the shaft causes magnetization to occur, or a change to an already existing magnetization, the magnetic coding may also be formed by one or more permanent magnets which is or are arranged on the respective end surface of the inner ring or outer ring, or the side of the seal.

The magnetic coding is preferably formed by at least one resonant circuit which emits electromagnetic radiation whose magnetic component, which varies over time, is detected by the receiver, in which case the transmitter may at the same time also serve as a receiver, and wherein the resonant circuit is arranged on the end surface of the inner ring or outer ring, or on the side of the seal. The resonant circuit also causes the electromagnetic field which is emitted from the transmitter to be damped or distorted, wherein the change in the electromagnetic field emitted from the transmitter is detectable. It is particularly preferable for the transmitter or receiver to be in the form of a coil, and for the resonant circuit to be supplied with power by the coil in the form of inductive coupling, and to be excited to emit the electromagnetic radiation.

Irrespective of the arrangement of the magnetic coding, it is preferable for the receiver to be arranged on a cover, and for the cover to axially close the roller bearing. The cover offers a secure seating for the receiver, and offers visual and mechanical closure, as well as additional protection for the roller bearing against the ingress of dirt.

If the receiver is arranged on a cover, then it is preferably provided for the cover to be fixable by means of a groove to one of the components of the roller bearing, in particular to the outer ring of the roller bearing, such that the cover and therefore the receiver are easily installable and, if required, is fitted such that it can be replaced.

It is preferably provided for the magnetic coding to be stamped into a body of the component of the roller bearing. In this case, the magnetic coding is imprinted in, for example on the end face of the bearing ring or on a side surface of the seal which faces outward.

As an alternative to this, it may be preferably provided for the magnetic coding to be attached as an additional body to a body of the component of the roller bearing, such that even roller bearings whose components are composed of a material which is not magnetizable can be retrospectively provided with a magnetic coding. It is also possible to replace the magnetic coding.

Further advantages and features of the invention are specified in the dependent claims and in the description of one preferred exemplary embodiment of the invention.

The invention will be described and explained in more detail in the following text using one preferred exemplary embodiment with reference to the attached drawings.

DETAILED DESCRIPTION

Figure 1:
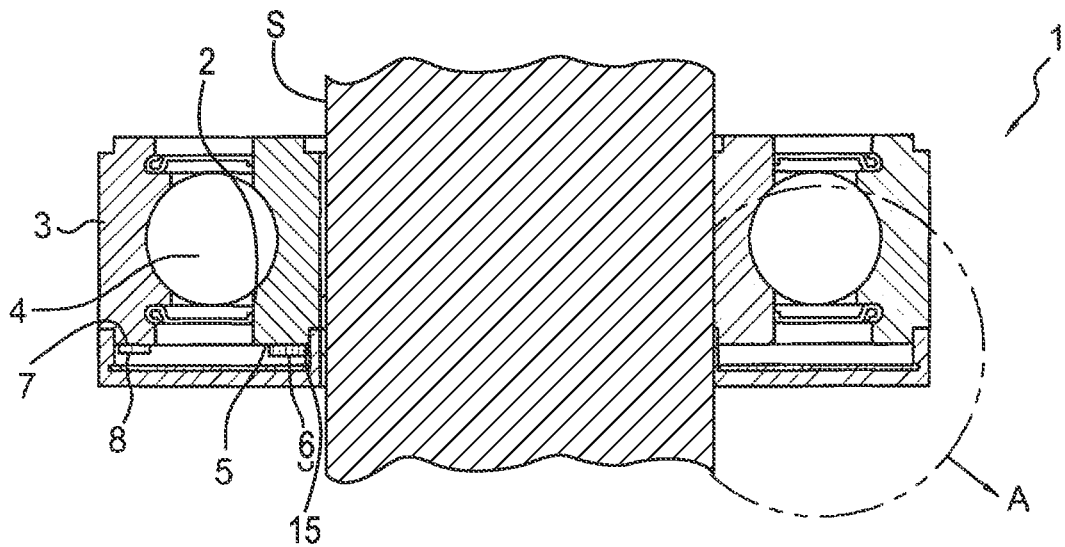
FIG. 1 shows a cross-sectional view of one preferred exemplary embodiment of a measurement arrangement according to the invention with one preferred exemplary embodiment of a bearing ring according to the invention, as a component of one preferred exemplary embodiment of a roller bearing according to the invention.
Figure 1A:
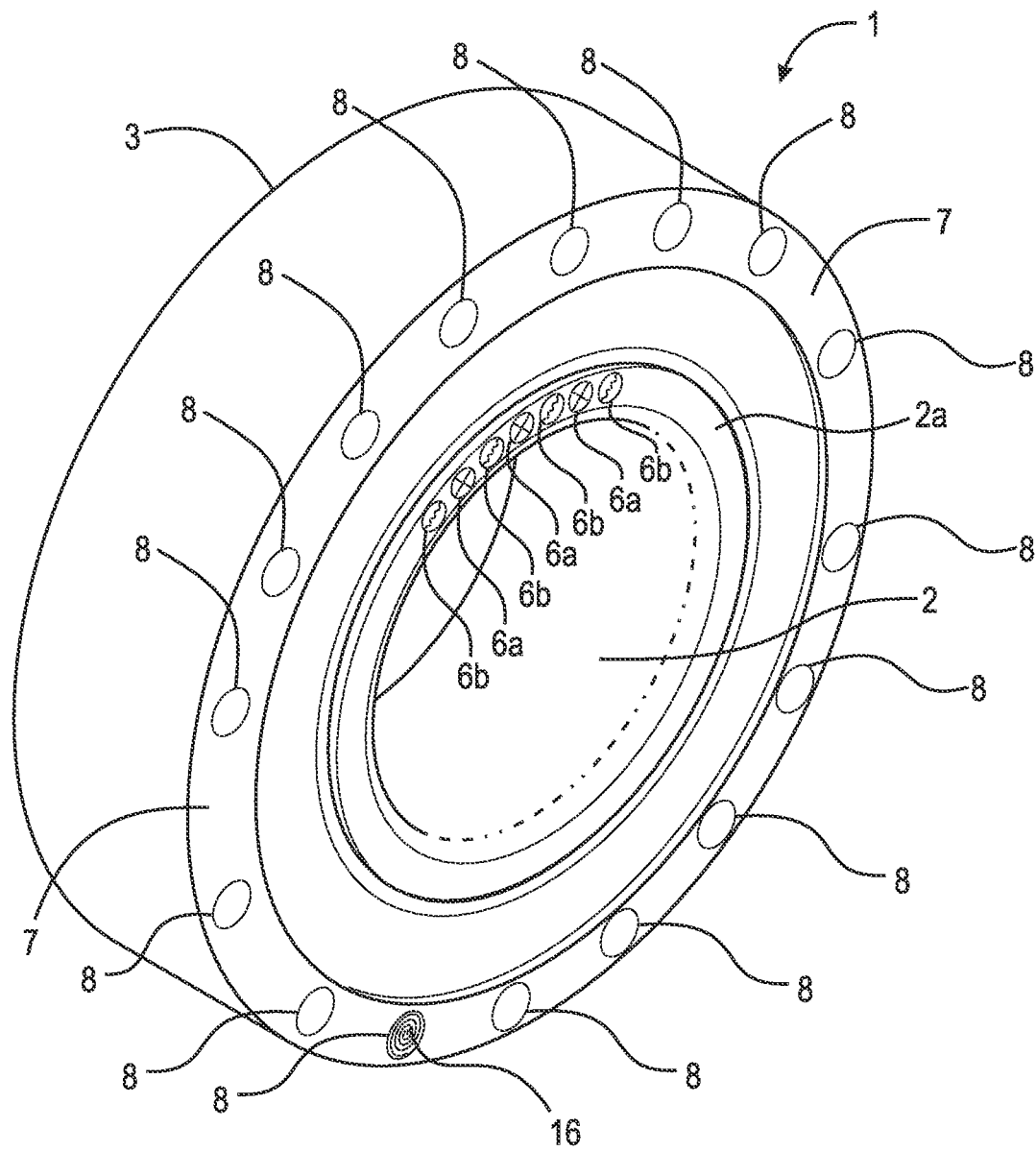
FIG. 1A is a side perspective view of the roller bearing seen in FIG. 1.
Figure 2A:
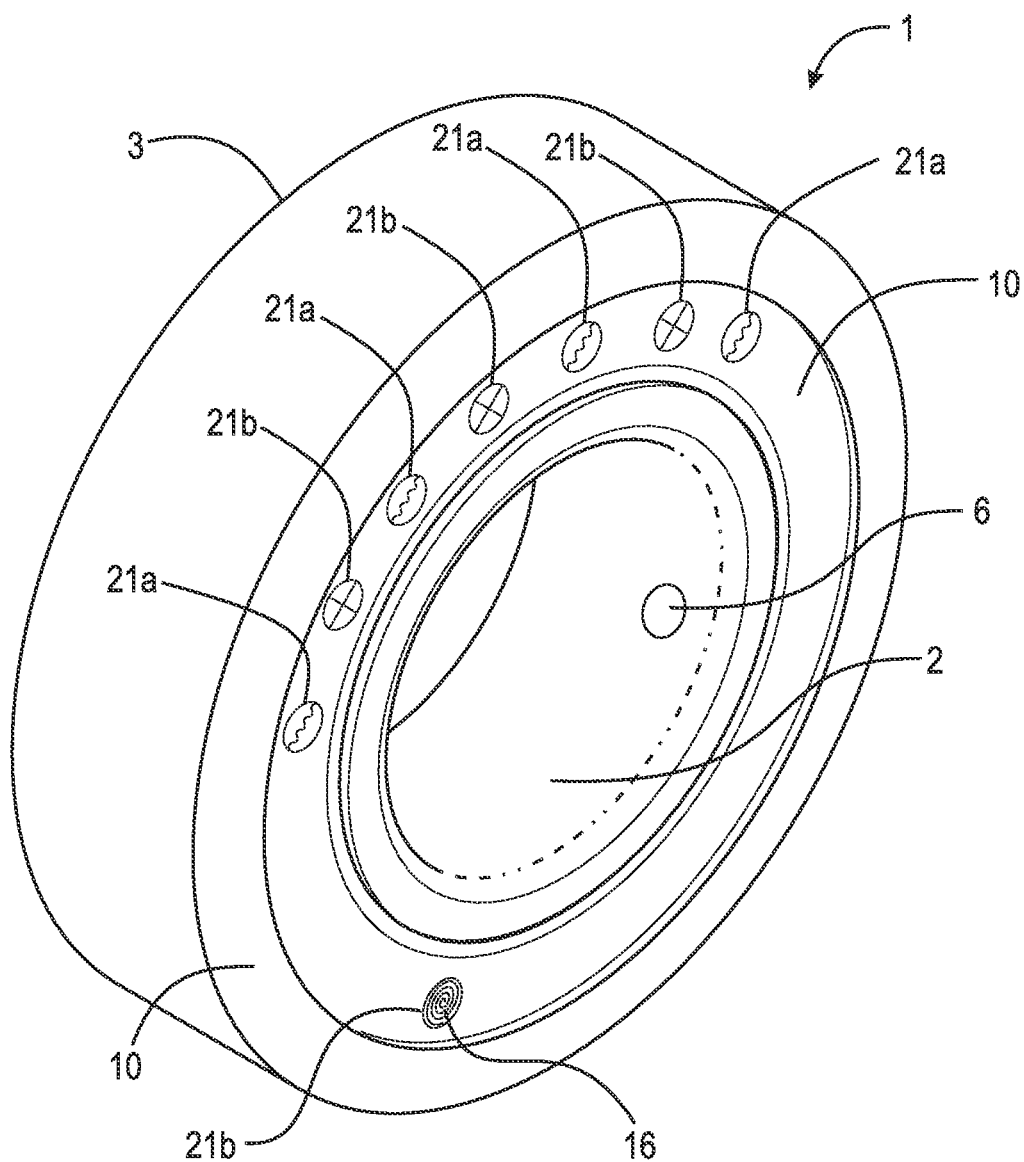
FIG. 2A is a second side perspective view of the roller bearing seen in FIG. 2.

FIG. 1 shows a roller bearing 1, comprising an inner ring 2, an outer ring 3 and roller bodies 4. A first magnetic coding 6 is applied to an end surface 5 of the inner ring 2. Furthermore, a second magnetic coding 8 is applied to an end surface 7 of the outer ring 3, with the second magnetic coding 8 being formed by eight magnetized sections of the end surface 7 of the outer ring 3 which are arranged running in the circumferential direction. The first magnetic coding 6 comprised a plurality of magnetic sections are arranged in the circumferential direction, in the case of which each two adjacent sections have different magnetization, with each of the sections being in the form on an annular segment. In an example embodiment, shaft S is arranged to be mounted in roller bearing 1. As seen in FIG. 1A, if the individual magnetized sections in the second magnetic coding 8 are separated from one another by magnetized section, then the magnetized sections which are adjacent in the first magnetic coding 6 are directly adjacent to one another. FIG. 1A also demonstrates the different magnetization of adjacent magnetic codings 6a and 6b represented by the symbols alternatingly depicted in codings 6a and 6b. It is self-evident that alternate magnetizations could also be seen in magnetic codings positioned on outer ring end surface 7.

The figure shows a shaft 22 in dashed lines which is clamped firmly in the inner ring 2 and is therefore mounted in the roller bearing 1.

Figure 2:
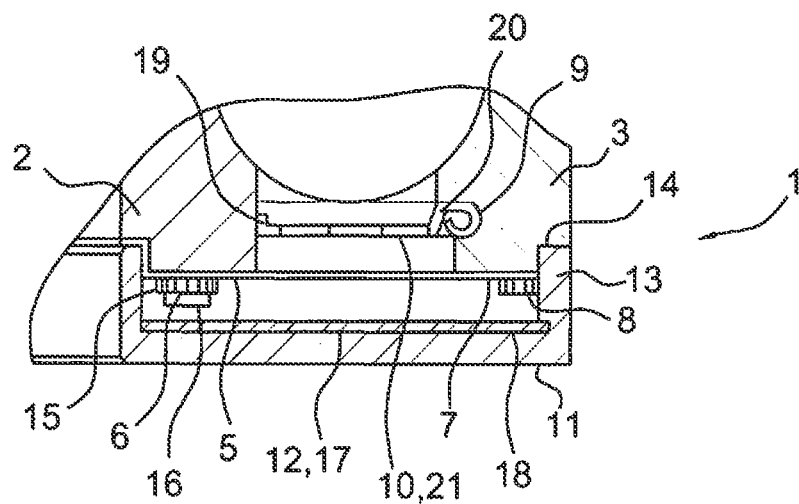
FIG. 2 shows an enlarged illustration of the section 'A' from FIG. 1.

FIG. 2 shows a detail of the roller bearing 1 with the inner ring 2, the outer ring 3 and some of the roller bodies 4, as well as a seal 10, which is illustrated schematically as a sealing disk, which has a first flange 19, a second flange 20, a sealing lip 9 and a magnetic coding 21. The roller bearing 1 furthermore comprises a cover 11, on which receivers 12, which are illustrated only schematically as a surface in sections, are arranged, with the receivers 12 detecting the magnetization of the first magnetic coding 6 or of the second magnetic coding 8. The cover 11 has a central bore through which the shaft is passed. The cover 11 is coincident with the seal 10 such that the receivers 12 are arranged on an extension of the axis of the shaft. That section of the receiver 12 which is associated with the first magnetic coding 6 or the second magnetic coding 8 is in each case arranged parallel to the axis of the shaft, offset at a very short distance from the two magnetic codings 6, 8. On its external circumference, the cover 11 has an axial stamped area 13, which engages in an associated groove 14 on the outer ring 3 or on the inner ring 2, in order to attach the cover 11 to the outer ring 3 or to the inner ring 2, respectively, such that the stamped area 13 latches in the groove 14, and closes the roller bearing 1 in the axial direction. The cover 11 is composed of a non-magnetic material, for example plastic, a ceramic or a metal.

In the exemplary embodiment described above, both a first magnetic coding 6 and a second magnetic coding 8 were provided. It is self-evident that a single magnetic coding is sufficient.

Instead of attaching the receivers 12 to the cover 11, which is fitted to a component of the roller bearing 1, specifically to the outer ring 3, the receivers 12 can also be attached to the component on which the roller bearing 1 is held, for example by the receivers 12 once again being held on a cover part, with the cover part being fitted to the component which holds the roller bearing 1.

In the exemplary embodiment described above, the magnetized sections of the first magnetic coding 6 and the second magnetic coding 8 were each imprinted into the body of the respective inner ring 2 and outer ring 3. It is self-evident that the respective coding may also be formed by bodies which are fitted to the end surface of the body of the relevant bearing component, that being one of the two bearing rings or the seal, provided that the bodies are subject to the magnetostrictive effect, that is to say they exhibit a change in the magnetization, or the occurrence of magnetization, when mechanical stress occurs in the structure of the body. It is also self-evident that, instead of individual bodies which are arranged physically separate, a single body can also be provided, that is in the form of an annular disk and is fitted flat to the end surface, with the magnetization varying in the radial direction along the single body.

In the exemplary embodiment described above, the magnetization occurred because of the magnetostrictive effect. It is self-evident that the magnetization can also be formed by one or more permanent magnets which can be arranged on an end surface of the inner ring or outer ring of the bearing, or on the seal of the bearing. The magnetic coding 6 or 8 then corresponds to the arrangement of the permanent magnets on the respective end surface 5 or 7 of the respective inner ring 2 or outer ring 3.

Alternatively, or in addition to the magnetization being formed by the magnetostrictive effect in the case of a section of the bearing component which is magnetizable or to form the magnetization by one or more permanent magnets, the magnetization may also be formed by a magnetic field which occurs at the location of the receiver 12, wherein the magnetic field is caused by a resonant circuit 16 which emits electromagnetic radiation whose magnetic-field component is detected by the receiver as a periodically varying magnetic field. In this case, the periodicity of the detected magnetic field of the resonant circuit 16 can be used as a basis to separate its component of the magnetic field as detected at the location of the receiver from stray fields, for example contributions from the earth's magnetic field, for example by electronic means. It is also possible to provide metallic reinforcement in the seal which, although it damps the magnetic field of the resonant circuit, it does not, however, shield it completely, such that the remaining component at the location of the receiver can be identified on the basis of the periodically varying field strength of the magnetic field, and can be associated with the resonant circuit as the source of the magnetic field. As the transmitter of the magnetic field, the resonant circuit may be charged by a power supply which is associated with it; as an alternative to this, it is possible to design the coil as a magnetic coil 17, which is in the form of a receiver such that the coil supplies the resonant circuit and the resonant circuit is supplied without the use of wires, in such a way that, the coil and the resonant circuit are inductively coupled. In this case, the magnetic field which is present in the coil and the magnetic-field component of the resonant circuit are superimposed in the area of the coil which is provided as a receiver, in such a way that the magnetic field of the coil is superimposed by the magnetic-field component of the resonant circuit. This superimposition leads to detuning of the magnetic field of the coil, that is to say to a change in the phase and/or amplitude, which change can be detected and provides information about the relative position of the resonant circuit with respect to the receiver. The resonant circuit therefore causes the field emitted from the coil to be damped or distorted, that is to say in any case changed, wherein the change in the field emitted from the coil can be detected, allowing the position of the resonant circuit relative to the coil to be deduced. When a mechanical load is applied to the shaft, particularly during rotation or translation of the mounted shaft, the signal received in the coil from the resonant circuit in this case changes. Resonant circuits such as these can easily be fitted as required to already existing roller bearings, linear bearings or journal bearings which are in the installed position, if required, thus allowing even finished bearings to be retrofitted in a simple manner.

The invention has been described above with reference to a roller bearing 1. It is self-evident that other types of bearings may also be provided, for example journal bearings or linear bearings, which hold a mounted shaft firmly clamped in and, for example, at one end have an end surface, wherein the end surface has magnetization, provided mechanical stresses occur in the bearing.

The invention claimed is:

1. A measurement arrangement for a shaft which is mounted in a bearing having a first surface with a raceway formed therein and an end side, which is perpendicular to the first surface, the measurement arrangement comprising:
   a magnetic coding, the magnetic coding further arranged to exhibit a magnetic field that changes by a magnetostrictive effect in response to a mechanical load applied to the shaft;
   a cover, which axially closes the bearing, having an outer surface facing away from the magnetic coding and an inner surface facing the magnetic coding; and,
   a receiver extending along an entire radial length of the inner surface of the cover and continuously contacting the inner surface of the cover, the receiver being operative to detect a change in the magnetic field of the magnetic coding caused by the mechanical load applied to the shaft and the receiver sensing the change in the magnetic field that is produced by the magnetostrictive effect as a result of the mechanical load,
   wherein the magnetic coding comprises at least one resonant circuit as a signal transmitter for the receiver, and the receiver detects a magnetic component of electromagnetic radiation emitted from the at least one resonant circuit; and,
   wherein the magnetic coding and the resonant circuit are arranged on the end side of the bearing.

2. The measurement arrangement of claim 1, wherein the bearing is a roller bearing and comprises an outer ring as a component, and the magnetic coding is arranged at an end surface of the outer ring.

3. The measurement arrangement of claim 2, wherein the magnetic coding has a sequence of areas which are radially circumferential at the end surface and adjacent to each other, and two of the areas of the sequence of areas, which are adjacent to each other, have different magnetization.

4. The measurement arrangement of claim 2, wherein the magnetic coding is imprinted in a body of a bearing ring of the roller bearing.

5. The measurement arrangement of claim 1, wherein the bearing is a roller bearing and comprises an inner ring as a component, and the magnetic coding is arranged at an end surface of the inner ring.

6. The measurement arrangement of claim 1, wherein the bearing has an outer ring and the cover is fixable by a groove to the outer ring of the bearing.

7. The measurement arrangement of claim 1, wherein the magnetic coding is attached as an additional body to the end side of the bearing.

8. The measurement arrangement of claim 1, wherein the receiver is a magnetic coil, which supplies the at least one resonant circuit with power in the form of inductive coupling.

9. The measurement arrangement of claim 1, wherein the end side has an end surface and the magnetic coding is arranged directly on the end surface.

10. A roller bearing mountable on a shaft, the roller bearing comprising;
    at least one bearing ring having a first surface with a raceway formed therein and an end side, which is perpendicular to the first surface; and
    a magnetic coding, the magnetic coding arranged to exhibit a magnetic field that changes by a magnetostrictive effect in response to a mechanical load applied to the shaft, when the roller bearing is mounted on the shaft,
    wherein the magnetic coding comprises at least one resonant circuit as a signal transmitter for a receiver, and the receiver detects a magnetic component of electromagnetic radiation emitted from the at least on resonant circuit; and,
    wherein the magnetic coding and the resonant circuit are arranged on the end side of the at least one bearing ring.

11. The roller bearing of claim 10, wherein the magnetic coding is a circumferential sequence of areas of the end side, and two of the areas of the sequence of areas, which are adjacent to each other, have different magnetizations.

12. The roller bearing of claim 10, wherein the magnetic coding is imprinted in the end side of the at least one bearing ring.

13. The roller bearing of claim 10, wherein the magnetic coding attached to the end side of the at least one bearing ring.

14. The measurement arrangement of claim 10, wherein the end side has an end surface and the magnetic coding is arranged directly on the end surface.

15. A bearing ring for a roller bearing mounted on a shaft, the bearing ring comprising:
    a body having a first surface with a raceway formed therein, an end surface, which is perpendicular to the first surface, and a magnetic coding provided directly and only on the end surface of the body of the bearing ring, the magnetic coding arranged to exhibit a magnetic field that changes by a magnetostrictive effect in response to a mechanical load applied to the shaft,
    wherein the magnetic coding comprises at least one resonant circuit as a signal transmitter for a receiver, and the receiver detects a magnetic component of electromagnetic radiation emitted from the at least one resonant circuit; and,
    wherein the magnetic coding and the resonant circuit is arranged on the end side of the bearing ring.

16. A seal for a roller bearing mountable on a shaft, the seal comprising:
    a sealing disk having abuse a first flange extending axially from a first end of the base, a second flange extending axially, in a same direction as the first flange, from a second end of the base, and a sealing lip extending from the second flange;
    and
    a magnetic coding arranged on the seal, the magnetic coding arranged to exhibit a magnetic field that changes by a magnetostrictive effect in response to a mechanical load applied to the shaft.

* * * * *